United States Patent [19]

Gardner-Chavis et al.

[11] Patent Number: 5,234,670

[45] Date of Patent: * Aug. 10, 1993

[54] REDUCTION OF NITROGEN OXIDE IN EFFLUENT GASES USING NCO RADICALS

[75] Inventors: Ralph A. Gardner-Chavis, Cleveland; Michael P. May, Canton, both of Ohio

[73] Assignee: Molecular Technology Corporation, Canton, Ohio

[ * ] Notice: The portion of the term of this patent subsequent to Jan. 7, 2009 has been disclaimed.

[21] Appl. No.: 668,045

[22] Filed: Mar. 12, 1991

Related U.S. Application Data

[63] Continuation-in-part of Ser. No. 585,403, Sep. 20, 1990, abandoned, and Ser. No. 585,592, Sep. 20, 1990, Pat. No. 5,078,982, and Ser. No. 585,886, Sep. 20, 1990, Pat. No. 5,087,431.

[51] Int. Cl.$^5$ ............................ C01B 21/00; B01J 8/00
[52] U.S. Cl. ....................................... 423/235; 423/239
[58] Field of Search ................... 423/235, 235 D, 239, 423/239 A

[56] References Cited

U.S. PATENT DOCUMENTS

| | | | |
|---|---|---|---|
| 3,545,917 | 12/1970 | Stephens | 23/2 |
| 3,714,071 | 1/1973 | Miohaiko | 252/448 |
| 3,746,498 | 7/1973 | Stengel | 431/4 |
| 3,867,312 | 2/1975 | Stephens | 252/462 |
| 3,867,507 | 2/1975 | Myerson | 423/212 |
| 3,900,554 | 8/1975 | Lejon | 423/235 |
| 4,124,689 | 11/1978 | Whelan | 423/437 |
| 4,199,554 | 4/1980 | Arati et al. | 423/239 |
| 4,208,386 | 6/1980 | Arand et al. | 423/235 |
| 4,221,768 | 9/1980 | Inoue et al. | 423/239 |
| 4,256,711 | 3/1981 | Sermon | 423/239 |
| 4,325,924 | 4/1982 | Arand et al. | 423/235 |

(List continued on next page.)

FOREIGN PATENT DOCUMENTS

| | | |
|---|---|---|
| 654427 | 12/1962 | Canada . |
| 2719417 | 2/1978 | Fed. Rep. of Germany . |
| 54-28771 | 3/1974 | Japan . |
| 53-76968 | 7/1976 | Japan . |
| 52-14619 | 2/1977 | Japan . |
| 52-42461 | 2/1977 | Japan . |
| 53-128023 | 11/1978 | Japan . |
| 2-191524 | 7/1990 | Japan | 423/239 |
| 1572118 | 7/1980 | United Kingdom . |

OTHER PUBLICATIONS

Yano et al., "Behavior of Methanol and Formaldehyde in Burned Gas from Methanol Combustion, Effects of Nitric Oxide on Oxidation Reaction", Bulletin of the SME, vol. 26, No. 213, pp. 406–413, (Mar. 1983).

H. Okabe, J. Chem. Phys., vol. 53, No. 9, pp. 3507–3515, (Nov. 1, 1970).

"Reducing $NO_X$ Emissions," Power, Sep. 1988, pp. S–1 to S–13.

R. A. Perry, J. Chem. Phys., 82, 5485–5488 (Jun. 15, 1985).

R. A. Perry and D. L. Siebers, Nature, vol. 324, 18–25, pp. 657–658, Dec. 18, 1986.

Primary Examiner—Gregory A. Heller
Attorney, Agent, or Firm—Renner, Otto, Boisselle & Sklar

[57] ABSTRACT

A process is described for reducing the nitrogen content of a post combustion gas which comprises the steps of (A) generating NCO free radicals, and thereafter (B) adding the free radicals to the gas whereby the NCO free radicals react with the nitrogen oxide in the gas to form nitrogen and carbon dioxide.

The NCO free radicals may be obtained from a variety of sources such as by the catalytic decomposition of cyanuric acid; the reaction of formaldehyde with nitrogen or nitric oxide; the reaction of carbon monoxide with nitrogen oxide or nitrogen or mixtures thereof; or the reaction of methanol with nitrogen in the presence of a catalyst. The NCO free radicals thus generated are effective for reducing the nitrogen oxide content of combustion gases in accordance with the process of the present invention at temperatures from ambient temperature up to about 2000° F.

20 Claims, 2 Drawing Sheets

U.S. PATENT DOCUMENTS

| | | | |
|---|---|---|---|
| 4,335,084 | 6/1982 | Brogan | 423/235 |
| 4,350,669 | 9/1982 | Izumi et al. | 423/235 |
| 4,528,279 | 7/1985 | Suzuki et al. | 502/200 |
| 4,585,632 | 4/1986 | Schneider et al. | 423/239 |
| 4,609,537 | 9/1986 | Talpin et al. | 423/244 |
| 4,617,175 | 10/1986 | Talpin et al. | 422/171 |
| 4,692,318 | 9/1987 | Talpin et al. | 423/239 |
| 4,719,092 | 1/1988 | Bowers | 423/235 |
| 4,731,231 | 3/1988 | Perry | 423/235 |
| 4,743,436 | 5/1988 | Lyon | 423/235 |
| 4,746,498 | 5/1988 | Berczak et al. | 423/244 |
| 4,760,044 | 7/1988 | Jay et al. | 502/303 |
| 4,791,091 | 12/1988 | Blicker et al. | 502/303 |
| 4,800,068 | 1/1989 | Perry | 422/173 |
| 4,849,192 | 7/1989 | Lyon | 423/235 |
| 4,851,201 | 7/1989 | Heap et al. | 423/235 |
| 4,861,567 | 8/1989 | Heap et al. | 423/235 |
| 4,867,954 | 9/1989 | Stanidis et al. | 423/239 |
| 4,868,148 | 9/1989 | Henk et al. | 502/303 |
| 4,874,590 | 10/1989 | Staniules et al. | 423/239 |
| 4,886,650 | 12/1989 | Perry | 423/235 |
| 4,908,193 | 3/1990 | Perry | 423/235 |
| 4,919,902 | 4/1990 | Bricker et al. | 423/213.5 |
| 4,923,842 | 5/1990 | Summers | 502/261 |
| 5,078,982 | 1/1992 | Gardner-Chavis et al. | 423/237 |
| 5,087,431 | 2/1992 | Gardner-Chavis et al. | 423/239 |

NO REDUCTION VERSUS ELAPSED TIME 5,234,670

REDUCTION OF NITROGEN OXIDE IN EFFLUENT GASES USING NCO RADICALS

CROSS REFERENCE TO RELATED APPLICATIONS

This application is a continuation-in-part of U.S. Ser. Nos. 07/585,403 now abandoned; 07/585592 now U.S. Pat. No. 5,078,982, and 07/585,886 now U.S. Pat. No. 5,087,431, all filed on Sep. 20, 1990. The specification of said applications are hereby incorporated by reference.

FIELD OF THE INVENTION

The present invention relates to a method of reducing nitrogen oxide emissions and thereby reducing pollution of the atmosphere. More particularly, the present invention relates to the use of NCO free radicals for reducing the nitrogen oxide content of post combustion gases.

BACKGROUND OF THE INVENTION

There has been considerable effort devoted in recent years to solving various ecological and environmental problems such as air pollution, acid rain, etc. Combustion effluents and waste products from various sources are a major source of air pollution when discharged into the atmosphere. Unless the waste products are treated to remove deleterious components, the degradation of the environment will continue. Acid rain, forest and vegetation decline, changes in the ozone layer, harmful and irritating smog, etc., are examples of the results of the pollution of the atmosphere.

The common sources of pollution include internal combustion engines, industrial plants, utility boilers, gas turbines, and commercial establishments such as service stations, dry cleaners, etc. It has been estimated that power plants are responsible for about ⅓ of the annual $NO_x$ emissions while mobile sources such as automobiles and trucks are responsible for about 40% to about 50%. The types of air pollutants generated by such facilities include particulate emissions such as coal ash, sulphur compounds such as $SO_2$ and $SO_3$, carbon monoxide, ozone, and nitrogen oxides, commonly referred to collectively as "$NO_x$".

One of the common components found in polluted air is nitrogen dioxide ($NO_2$) which is known to be an extremely poisonous material. Nitrogen dioxide is introduced into the atmosphere from the various sources such as commercial plants producing nitric acid, but a major source of nitrogen dioxide is from nitric oxide (NO) formed by combustion processes of the types described above. The nitrogen oxide is formed during such combustion processes by (1) the reaction of nitrogen with atmospheric oxygen in the high temperature portion of the flame ("thermal fixation); and (2) the oxidation of organic nitrogen compounds in the fuel on burning. The nitric oxide formed on combustion is converted to nitrogen dioxide on contact with air in the atmosphere.

Various procedures have been suggested to remove the oxides of nitrogen from waste gases so that the gases may be discharged into the atmosphere without harm to the environment. Nitrogen oxide(s) emissions from boilers, gas turbines and internal combustion engines have been reduced by modifying the design of the engine or boiler to be more efficient or to operate at a lower temperature. Other proposals for reducing nitrogen oxide emissions involve use of various chemicals to reduce the nitrogen oxide content of effluent gases by converting the nitrogen oxides to innocuous gases. Such chemical processes, however, generally require extremely high temperatures such as in the range of about 1600° to about 2000° F. and higher. The temperatures of some of these chemical reactions for reducing nitrogen oxide content have been reduced by utilizing catalysts which are effective in promoting the reduction of nitrogen oxide. Processes using a catalyst to promote the reduction of nitrogen oxide are generally referred to as selective catalytic reduction ("SCR") processes. Using a catalyst in the effluent gas streams has certain disadvantages such as the expense of the catalyst, the life of the catalyst, the expense and difficulty of contacting the combustion effluents with the catalyst, etc. Accordingly, there has been continued emphasis on procedures for reducing nitrogen oxide emissions which do not involve the direct use of catalysts. Processes for reducing nitrogen oxide content of effluent gases which do not use a catalyst in the effluent gas stream are referred to in the art as selective non-catalytic reduction ("SNR") processes.

Various techniques for reducing $NO_x$ emissions from various combustion processes are described in the article entitled "Reducing $NO_x$ Emissions,"*Power* Sep. 1988, pp S-1 to S-13. Among the chemicals which have been suggested as being useful in reducing the nitrogen oxide content of combustion effluents are nitrogen-containing compounds such as ammonia, urea, cyanuric acid, etc. For example, U.S. Pat. Nos. 3,900,554; 4,335,084; 4,743,436; 4,849,192; and 4,851,201 describe processes utilizing ammonia to reduce nitrogen oxide emissions.

The use of urea is described in U.S. Pat. Nos. 4,208,386; 4,325,924; 4,719,092; and 4,851,201. The use of cyanuric acid, and more specifically, the decomposition product of cyanuric acid, isocyanic acid, for reducing the nitrogen oxide content of combustion effluents is described in U.S. Pat. Nos. 4,731,231; 4,800,068; 4,861,567; and 4,908,193; and by R. A. Perry and D. L. Siebers, *Nature* Vol. 324, 18/25, pp 657–658, Dec. 18, 1986. Perry proposes that isocyanic acid (HNCO) is formed from the decomposition of cyanuric acid when cyanuric acid is heated above about 330° C. When the isocyanic acid is mixed with the exhaust gas stream at temperatures 400° C. or higher, a series of reactions is proposed to occur that results in the loss of HCNO and NO. U.S. Pat. No. 4,908,193 contains one claim (claim 21) to a method of reducing the NO content of a gas stream by contacting the gas stream with NCO radicals provided the NCO radicals have not been generated by addition directly to said NO-containing gas stream per se of solid cyanuric acid particles of a diameter of 0.1 to 10 mm.

U.S. Pat. Nos. 4,743,436 and 4,849,192 describe the process for treating effluent gases containing nitrogen oxides, sulfur trioxide, etc., wherein the effluent gas is first treated with ammonia to reduce the nitrogen oxide content and thereafter with methanol to reduce the sulfur trioxide content of the combustion effluent to $SO_2$ thereby minimizing the formation of ammonium bisulfate and sulfuric acid.

Japanese Patent 54-28771 discloses the addition of particles with cyanuric acid within the range of 0.1 to 10 mm. in diameter to exhaust gases to remove $NO_x$. Temperatures of from 600° to 1500° C. are disclosed with the preference expressed for temperatures of 1200°-1300° C. A surface reaction is postulated.

The decomposition products obtained from the photodissociation of HNCO in the vacuum ultraviolet is the subject of an article by H. Okabe in the *I. Chem. Phys.*, Vol. 53, No. 9, pp. 3507-15, (Nov. 1, 1970). Previous authors had suggested that the product of the photodissociation of HNCO would include compounds such as NH, NCO, CO, $NH_2$, $N_2$ and $H_2$. The HNCO utilized in Okabe's studies was prepared from cyanuric acid powder. Okabe concluded that the product of the photodissociation of HNCO in the vacuum ultraviolet was NCO and NH. The role of NCO radicals as intermediates in fuel bond nitrogen conversion was discussed by R. A. Perry in *I. Chem. Phys.*, 82, 5485-88 (Jun. 15, 1985). Perry summarized the work of previous investigators relating to the production of NCO radicals and subsequent reactions of NCO in flames, and Perry noted that Cookson et al, *Ber. Bunsenges, Phys. Chem.*, 89, 335 (1985) had reported measuring the room temperature rate for the reaction of NCO with NO. Perry suggested three possible reaction schemes for the reaction of NCO with NO as follows:

(A) $NCO + NO = N_2O + CO$;
(B) $NCO + NO = N_2 + O + CO$; and
(C) $NCO + NO = N_2 + CO_2$.

Perry concluded from his study of the temperature rate constant of the reaction that the reaction of NCO with NO proceeds in accordance with reaction (A). The value obtained by Perry was reported to be in agreement with the value obtained by Cookson et al for the same reaction. Perry further postulated that reaction (C) was unlikely. Perry also concluded that the reaction of NCO with NO may be an important source of nitrous oxide formation in those flames where NCO and NO are present in sufficient concentration. The Perry article does not relate to any process for treating exhaust gases, and does not disclose generating NCO free radicals and thereafter adding the free radicals to an exhaust to react with the $NO_x$ in the post-combustion gases in the exhaust.

SUMMARY OF THE INVENTION

A process is described for reducing the nitrogen oxide content of a gas, such as a post combustion gas, which comprises the steps of
(A) generating NCO free radicals, and thereafter
(B) adding the free radicals to the gas whereby the NCO free radicals react with the nitrogen oxide in the gas to form nitrogen and carbon dioxide. The NCO free radicals may be obtained from a variety of sources such as by the catalytic decomposition of cyanuric acid; the reaction of formaldehyde with nitrogen or nitric oxide; the reaction of carbon monoxide with nitrogen oxide or nitrogen or mixtures thereof; the reaction of methanol with nitrogen in the presence of a catalyst, etc. The NCO free radicals thus generated are effective for reducing the nitrogen oxide content of post combustion gases in accordance with the process of the present invention at temperatures from ambient temperature up to about 2000° F.

DESCRIPTION OF THE PREFERRED EMBODIMENTS

Throughout the specification and claims, the terms "nitrogen oxide(s)" and "$NO_x$" are used in the generic sense to include the various nitrogen oxide compounds such as nitrous oxide ($N_2O$), nitric oxide (NO) and nitrogen dioxide ($NO_2$). The term "post combustion gas" is used to refer to effluent gases generated by and resulting from combustion processes.

In the present invention the NCO free radicals are reacted with $NO_x$ in a post combustion gas stream in the absence of any added catalyst. Catalysts are used in some embodiments in the generation of the NCO free radicals. In this manner, the catalyst is not subjected to the poisoning effect of the effluent gases and can be utilized in the NCO generating reactions for extended periods. Accordingly, the method of the present invention for reducing the nitrogen oxide content of effluent gases is essentially a selective, thermal, non-catalytic reduction process (SNR) which can be conducted at temperatures lower than the temperatures normally utilized in SNR processes.

Generation of NCO Radicals.

In the present invention, the nitrogen oxide content of a post combustion gas is reduced by adding to the gas, NCO free radicals formed in a separate NCO free radical generator which may comprise a catalytic reactor. Any source of NCO free radicals can be utilized in the process of the present invention. Examples of sources of NCO free radicals that can be utilized in the process of the present invention include: the catalytic decomposition of cyanuric acid; the reaction of formaldehyde with nitrogen or nitric oxide (NO) or mixtures of nitrogen and nitric oxide, generally in the presence of a catalyst; the reaction of carbon monoxide with nitrogen or nitric oxide; the reaction of methanol with nitrogen; etc. Although catalysts may be utilized in these NCO free radical generating reactions, the catalysts are not subject to poisoning by combustion gases since the catalysts are not exposed to the combustion gases in the process of the present invention.

Figure 1:
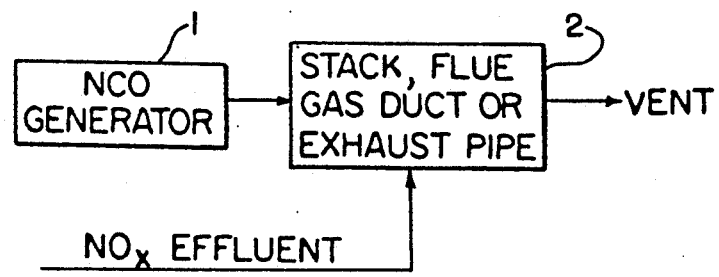
FIG. 1 is a flow diagram of the general process of the invention wherein the NCO free radicals are generated and added to a stack, flue gas duct or exhaust pipe containing $NO_x$ effluent.

FIG. 1 illustrates the general process of the present invention wherein NCO free radicals are formed in an NCO generator 1. The NCO free radicals are then introduced into a stack, flue gas duct or exhaust pipe 2 through which an $NO_x$ effluent (i.e., post combustion) is advanced. The NCO free radicals react with the $NO_x$ in the effluent gas thereby reducing the $NO_x$ content of the gas which may then be vented to the atmosphere.

In one embodiment, NCO free radicals are generated by heating cyanuric acid at temperatures below about 1000° F. in the presence of a catalyst which promotes the decomposition. The cyanuric acid which is utilized in the present invention is commercially available, and may be generally represented by the formula $(HOCN)_3$.

Throughout this specification in claims, reference to cyanuric acid is intended to include reference to its tautomer, isocyanuric acid, since, for purposes of this invention, the two forms are equivalent.

Prior art patents and publications such U.S. Pat. Nos. 4,731,231; 4,800,068; and 4,861,567, and the article by Perry in *Nature* described previously suggest that the thermal, non-catalytic decomposition of cyanuric acid results in the formation of isocyanic acid (HNCO) which then reacts with hydrogen to form $NH_2$ free radicals. The $NH_2$ free radicals react with NO to form $N_2$ and $H_2O$.

The decomposition product obtained by the catalytic decomposition of cyanuric acid at a temperature below about 1000° F. which may comprise other species in addition to the NCO free radicals is useful and successful in reducing the nitrogen oxide content of gas streams at lower temperatures than attained by some prior art processes such as the processes described by Perry and others using the product of non-catalytic thermal decomposition of cyanuric acid Although we do not wish to be bound by any theory, one possible decomposition reaction resulting in NCO free radicals which may be postulated is

$$(HNCO)_3 \rightarrow 3NCO + 3/2H_2 \qquad (1)$$

Examples of catalysts which promote the decomposition of cyanuric acid and the formation of NCO free radicals at temperatures below about 1000° F. include zirconium, phosphorus, and mixtures of zirconium and phosphorus. The oxides of zirconium and phosphorus are examples of compounds useful as catalysts. The catalysts may also contain other metals. In a preferred embodiment, the catalysts comprise zirconium in the plus four oxidation state, phosphorus in the plus four oxidation state, or mixtures thereof. Compounds of zirconium or phosphorus containing at least some zirconium or phosphorus in the plus four oxidation state are preferred as catalysts. Zirconium and phosphorus in the oxide forms are examples of compounds which may contain zirconium and phosphorus in the plus four oxidation state. An example of a zirconium compound containing zirconium in the plus four oxidation state is zirconium oxide. An example of a phosphorus material which may contain at least some phosphorus in the plus four oxidation state is phosphorus pentoxide.

The zirconium catalyst of the types which can be utilized in the method of the present invention are commercially available and they contain at least some zirconium in the plus four oxidation state. For example, the catalyst may be commercially available mixed-metal oxide catalysts which contain at least some zirconium or phosphorus in the plus four oxidation state. An example of a commercial zirconium-containing catalyst useful in the method of this invention is the zirconia catalyst ZR-0304T1/8 available from the Engelhard Corporation.

The catalyst utilized may be formed in any conventional manner such as tableting, pelleting, etc., or the active catalyst material can be supported on a carrier. The carrier is generally inert and may include silica, alumina, clay, alumina-silica, silicon carbide, or even zirconia. The catalyst material can be deposited upon the carrier by techniques well known to those skilled in the art such as by depositing a solution containing the catalytic components on the carrier and thereafter drying and calcining the material. Utilizing these techniques, the catalytic components may be either coated on or impregnated in a carrier.

Cyanuric acid may be decomposed in accordance with the method of the present invention by contacting the cyanuric acid with the catalyst at a temperature below about 1000° F., and more generally at a temperature of from about 760° F. to about 960° F. The contact between the cyanuric acid and the catalyst can be effected by mixing the cyanuric acid with the catalyst prior to subjecting the mixture to the elevated temperatures. Alternatively, cyanuric acid can be first vaporized at an elevated temperature such as about 500° F. and above, and the cyanuric acid vapors thereafter brought into contact with the catalyst to effect the decomposition at a temperature below about 1000° F. The latter process presently is preferred since it appears that this process results in an increase in the useful life of the catalyst, and, in some instances, it appears that the decomposition product gas obtained by first vaporizing the cyanuric acid followed by catalytic decomposition is a more effective product mixture for reducing the nitrogen oxide content of effluent gases.

In other embodiments of the present invention NCO free radicals can be generated from formaldehyde by reaction with nitrogen, nitric oxide, or mixtures thereof. In the first embodiment, the process comprises reacting formaldehyde with nitrogen in the presence of a catalyst comprising vanadium or zirconium, or a mixture of vanadium and zirconium at a temperature from about 700° F. to about 1000° F.

Since the catalytic reaction of formaldehyde with nitrogen is conducted at elevated temperatures, various forms of formaldehyde and formaldehyde derivatives which are thermally decomposable to form formaldehyde at elevated temperatures can be utilized in the reaction. Thus, sources of formaldehyde useful in the first step of method of the present invention include solutions of formaldehyde in water (e.g., 37% by weight solution in water), formaldehyde gas, or a formaldehyde derivative compound which decomposes and generates formaldehyde upon heating. Examples of such formaldehyde derivatives include paraformaldehyde, trioxane, etc. Throughout this specification and claims, the term formaldehyde includes formaldehyde in various forms and derivatives which decompose to form formaldehyde under the reaction conditions.

In one embodiment of the present invention, the formaldehyde is derived from methanol. Formaldehyde can be readily produced from methyl alcohol and air (oxygen) by techniques well known to those skilled in the art. For example, methanol can be oxidized to formaldehyde in the presence of various catalysts such as iron-molybdena (FeMo) at temperatures of from about 550° F. to 650° F. As the formaldehyde is produced in the reaction, it can be stored or used immediately for the formation of NCO free radicals.

The catalysts which can be utilized to promote the reaction of formaldehyde with nitrogen include catalysts comprising vanadium or zirconium or a mixture thereof. In one preferred embodiment, at least some of the vanadium and/or zirconium in the catalysts is present in the plus four oxidation state.

The oxides and sulfides of vanadium and zirconium are examples of compounds found to be useful as catalysts. Zirconium and vanadium in the oxide and sulfide forms are examples of compounds which contain zirconium and vanadium in the plus four oxidation state. A particular examples of a zirconium compound containing zirconium in the plus four oxidation state is zirconium oxide, and a specific example of vanadium in the plus four oxidation state is $VO_2$ which may be present in small but sufficient quantity at certain crystal faces and discontinuities of $V_2O_5$. Vanadium and zirconium catalysts useful in the method of the present invention are commercially available, and they often contain at least some vanadium or zirconium in the plus four oxidation state along with other metals. For example, the catalysts useful in the method of the present invention may be commercially available mixed-metal oxide catalysts which contain at least some zirconium in the plus four oxidation state. Examples of unsupported powder catalysts include zirconium oxide and vanadium pentoxide powders from Aldrich Chemical Co. An example of a commercial supported zirconium-containing catalyst useful in the present invention is the zirconia catalyst ZR-0304T1/8 available from the Engelhard Corporation. An example of a commercial supported vanadium compound useful as a catalyst in the invention is the presulfated vanadium catalyst C116,3/16 available from United Catalysts, Inc.

The catalyst used in this embodiment may be formed in any conventional manner such as extrusion, tableting, pelleting, etc., or the active catalyst material can be supported on a carrier. The carrier is generally inert and may include silica, alumina, clay, alumina-silica, silicon carbide, zirconia, etc. The catalyst material can be deposited upon the carrier by techniques well known to those skilled in the art such as by depositing a solution containing the catalytic components on the carrier and thereafter drying and calcining the material. Utilizing these techniques, the catalytic components may be either coated on or impregnated in a carrier.

The reaction between formaldehyde and nitrogen in the presence of the above-identified catalysts generally is conducted at temperatures between about 600° F. to about 1200° F. More generally, the reaction is conducted at temperatures of from about 600° F. to about 990° F. The formaldehyde and nitrogen can be mixed and thereafter heated to the desired temperatures, or the formaldehyde and nitrogen can be preheated and combined at the desired elevated temperature to effect the reaction.

The reaction product gas obtained by the catalytic reaction of formaldehyde with nitrogen contains NCO free radicals and is effective in reducing the nitrogen oxide content of effluent gases at temperatures which are lower than the temperatures used in many other SNR processes. In some instances, the nitrogen oxide content of effluent gases can be reduced at very low temperatures including ambient temperature.

It has been suggested that formaldehyde and nitrogen react in the presence of a catalyst to form free radicals in accordance with the following reaction:

$$H_2CO + N_2 = NCO + NH_2 \quad (2)$$

The above postulated free radicals can then react with nitrogen oxide, and in particular, nitric oxide to form innocuous materials such as nitrogen, carbon dioxide and water in accordance with the following proposed reactions:

$$NO + NCO = N_2 + CO_2 \quad (3)$$

$$NO + NH_2 = N_2 + H_2O \quad (4)$$

As can be seen from the above reaction, one mole of formaldehyde should be effective in reacting with and removing two moles of nitric oxide from the gas stream resulting in the formation of water and carbon dioxide.

In a second embodiment using formaldehyde, NCO free radicals can be generated by reacting formaldehyde with nitric oxide. The reaction may occur in accordance with the following reaction $$H_2CO + NO \rightarrow NCO + H_2O \quad (5)$$

Catalysts can be utilized which promote the reaction of the nitric oxide with formaldehyde, and in the presence of the catalysts, the reaction can be conducted at lower temperatures. In particular, when nitric oxide is brought into contact with formaldehyde in the presence of a catalyst for the reaction, the reaction can be conducted at temperatures of as low as 700° F., and with some catalyst combinations, the reaction is catalyzed to the point of about 100% nitric oxide reacted at about 1000° F. or greater.

Any catalyst which promotes the reaction of formaldehyde with nitric oxide can be utilized in the method of the present invention. Particular examples of catalysts which are useful include catalysts comprising zirconium, cerium, and mixtures of zirconium and cerium. In one preferred embodiment, at least some of the zirconium and cerium in the catalysts is present in the plus four oxidation state. Particularly improved results have been obtained utilizing a catalyst comprising both zirconium in the plus four oxidation state and cerium in the plus four oxidation state.

The oxides of zirconium and cerium are examples of compounds found to be useful as catalysts. Zirconium and cerium in the oxide forms are examples of compounds which contain zirconium and cerium in the plus four oxidation state. A particular example of a zirconium compound containing zirconium oxide in the plus four oxidation state is zirconium oxide, and a specific example of a cerium compound containing cerium in the plus four oxidation state is cerium oxide. Zirconium and cerium catalysts useful in the method of the present invention also are commercially available, and they often contain at least some zirconium or cerium in the plus four oxidation state along with other metals. The catalysts often contain other metals. For example, the catalysts useful in the method of the present invention may be commercially available mixed-metal oxide catalysts which contain at least some zirconium in the plus four oxidation state. An example of a commercial zirconium-containing catalyst useful in the present invention is the zirconia catalyst ZR-0304T1/8 available from the Engelhard Corporation.

The mechanism by which the catalysts promotes the reaction of the formaldehyde with nitrogen oxide is not presently known with any certainty, and applicants do not wish to be bound by any theory. The significant fact for the purpose of the present invention is that introduction of formaldehyde into a reactor containing nitric oxide at an elevated temperature in the presence of a catalyst results in a reaction with the nitric oxide and the formation of NCO radicals at a temperature which is lower than the temperature required in the absence of a catalyst. The formaldehyde may be introduced into the reaction zone as a solution of the formaldehyde in water (e.g., 37% by weight solution in water), as formaldehyde which has been vaporized prior to addition to the reaction zone, or as a formaldehyde derivative compound which decomposes and generates formaldehyde upon heating. As noted with the previous embodiment, the formaldehyde utilized may be derived from methanol.

The nitrogen oxide which can be reacted with formaldehyde to form NCO may be purified nitric oxide available commercially from a variety of sources, or the nitric oxide can be obtained from combustion gases derived from mobile sources including internal combustion engines such are used in automobiles or fixed or stationery sources including stack gases from commercial and residential furnaces, kilns, residual oil and coal-fired utility boilers, industrial boilers, gas turbines, incinerators, diesel engine generators, etc. When the nitric oxide source is a post combustion gas, the gas preferably is pretreated to remove undersirable combustion products such as soot. It is preferred to use a commercial source of purified NO in the reaction in order to produce NCO free radicals free of undesirable side products. The use of purified NO also results in longer catalyst life since the catalyst is not contaminated by soot and other combustion by-products.

In another embodiment, the NCO free radicals may be generated by reaction of carbon monoxide with nitrogen, nitric oxide, or mixtures thereof. The formation of NCO free radicals in such reactions may be promoted by catalysts. Although not wishing to be bound by any theory, it is believed that the NCO free radicals are formed in accordance with the following reactions.

$$2CO + N_2 = 2NCO \quad (6)$$

$$2CO + 2NO = 2NCO + O_2 \quad (7)$$

In a further embodiment, the NCO free radicals utilized in the process of the present invention may be prepared directly from methanol by reaction with nitrogen, preferably in the presence of a catalyst. The NCO free radicals may be formed by one or more of the following reactions.

$$2CH_3OH + N_2 = 2NCO + 2H_2 \quad (8)$$

$$CH_3OH + N_2 = NCO + NH_2 + H_2 \quad (9)$$

NCO free radicals also may be obtained by reaction of hydrocarbons with nitric oxide. The hydrocarbons may be saturated or unsaturated. Preferably the hydrocarbons will contain from 1 to about 4 carbon atoms. Examples of useful hydrocarbons include methane, ethane, propane, ethylene, propylene, acetylene, and mixtures thereof. The reaction is illustrated with methane as follows:

$$CH_4 + NO \rightarrow NCO + 2H_2 \quad (10)$$

Other sources of NCO radicals include the following reactions: amides, imides and anilides with nitrogen; alcohols, aldehydes (in addition to methanol and formaldehyde discussed above) amines, amides, imides and anilides with nitrogen; oxygen and HCN; ammonia with CO, $CO_2$ or mixtures of CO and $CO_2$; carbon dioxide with nitrogen; urea with nitrogen and a t-butoxy radical; formamide with nitrogen and a t-butoxy radical; decomposition of methyl isocyanate, methyl cyanate and homologues thereof, including aliphatic as well as aromatic homologues.

(B) Addition of NCO to Post Combustion Gases.

Figure 2:
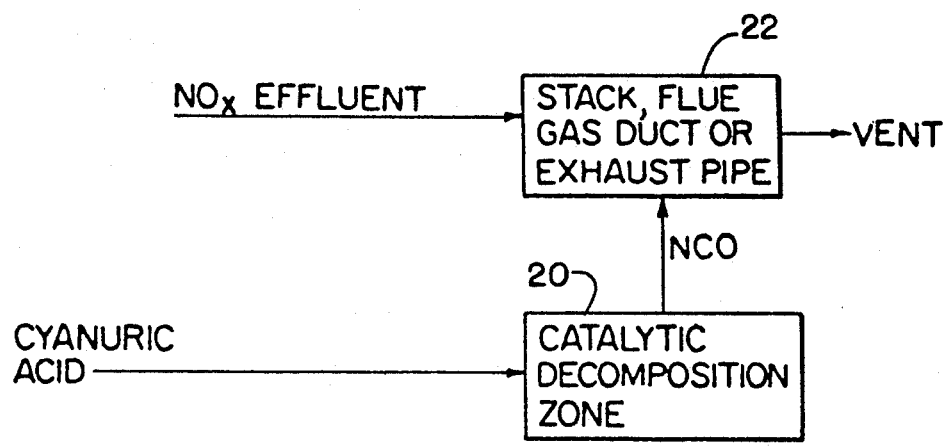
FIG. 2 is a flow diagram of one embodiment of the invention wherein the NCO free radicals are generated from cyanuric acid.
Figure 3:
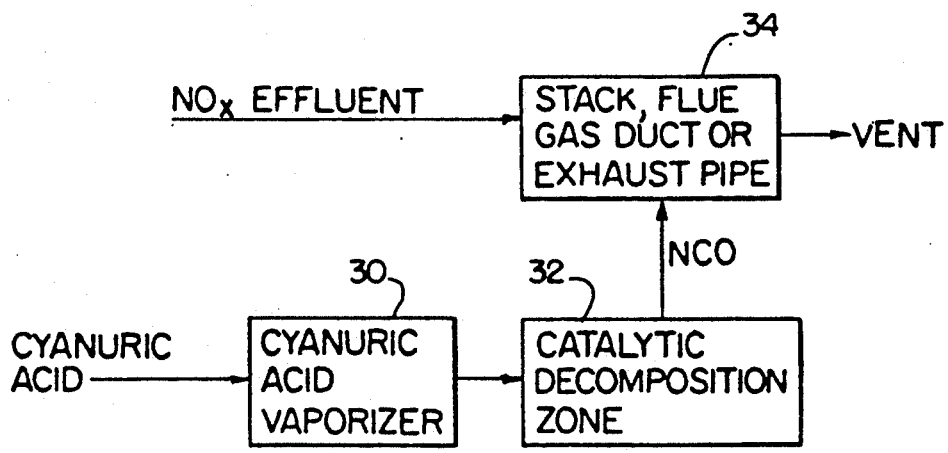
FIG. 3 is a flow diagram of another embodiment of the invention wherein the cyanuric acid is vaporized prior to catalytic decomposition.
Figure 4:
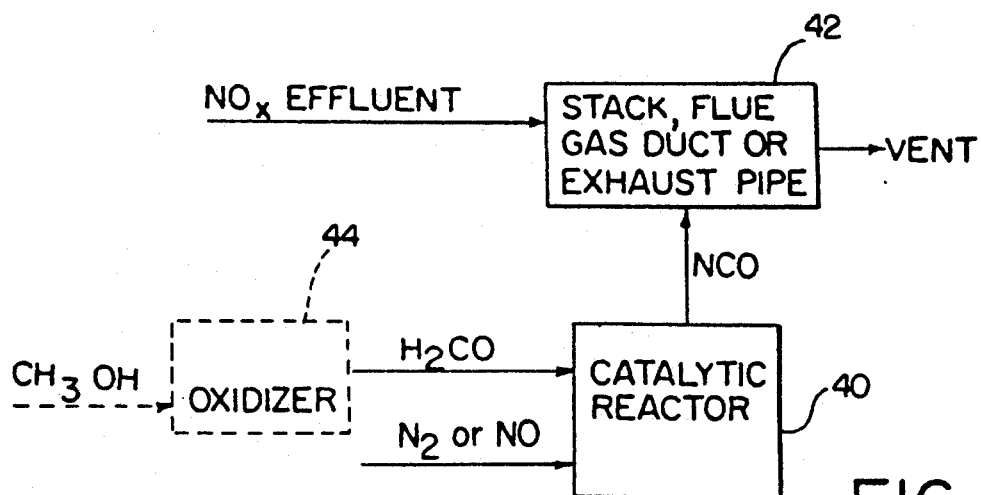
FIG. 4 is a flow diagram of another embodiment of the invention wherein the NCO free radicals are generated from formaldehyde in the catalytic reactor.

The procedures for carrying out the method of the various embodiments of the present invention are illustrated in FIGS. 2-4. In FIG. 2, cyanuric acid is mixed with the catalyst described above in a catalytic decomposition zone 20 where the combination is heated to an elevated temperature to effect decomposition of the cyanuric acid into a gaseous decomposition product containing NCO free radicals. The product containing NCO free radicals is advanced to a gas stack, flue gas duct or exhaust pipe 22 where the NCO free radicals are brought into contact with the $NO_x$ effluent at a temperature sufficient to effect a reaction between free radicals and $NO_x$. The period of contact between the free radicals and the $NO_x$ effluent is dependent upon a variety of factors including: concentration of $NO_x$ in the effluent; the concentration of the NCO free radicals in the gaseous decomposition product which is dependent in part upon the amount of cyanuric acid in the decomposition zone and the rate of decomposition of the cyanuric acid; the temperature of the gases within the stack, flue gas duct or exhaust pipe; the concentration of $NO_x$ in the effluent; the period of time between the formation of the NCO free radicals and contact with the $NO_x$ effluent; etc. The gas exiting the stack, duct or pipe 12 which contains a reduced concentration of $NO_x$ is vented to the atmosphere.

In the embodiment illustrated in FIG. 3, cyanuric acid is vaporized in vaporizer 30 by heating to an elevated temperature such as about 500° F. and above, and the cyanuric acid vapors then are advanced to decomposition zone 32 which contains a catalyst in accordance with the method of the present invention. When the vaporized cyanuric acid is heated to a temperature of up to about 1000° F. in the decomposition zone in the presence of the catalyst, the cyanuric acid decomposes to form a gaseous decomposition product containing NCO free radicals which is then advanced to the stack, flue gas duct or exhaust pipe (reactor) 34. In reactor 34 the gaseous NCO free radicals from the decomposition zone are brought into contact with a nitrogen oxide containing post combustion gas resulting in a reaction which converts the nitrogen oxides to innocuous gases such as nitrogen, carbon dioxide, and water vapor which may then be vented to the atmosphere. Cyanuric acid can be vaporized in the vaporizer 30 at temperatures from about 500° F. to about 1000° F., and more generally from temperatures of about 600° to 700° F. The temperatures within the catalytic decomposition zone 20 in FIG. 2 and zone 32 in FIG. 3, will generally be below about 1000° F., more generally will be at a temperature between about 760° to 960° F. In one preferred embodiment, the decomposition of the cyanuric acid in the presence of the catalyst is effected at a temperature from about 800° F. to about 950° F.

The reaction between nitrogen oxide-containing gas and the NCO free radicals obtained from the catalytic decomposition of cyanuric acid can be effected at temperatures within a range of from about 300° F. to about 1600° F. More generally, the reaction can be effected at a temperatures of about 700° F. to about 1200° F., and this reaction is effected in the absence of any catalyst. The reaction results in a significant reduction in the concentration of nitric oxide in the gas.

The amount of cyanuric acid introduced into the decomposition zone 20 of FIG. 2, or zone 32 of FIG. 3 is an amount which will generate sufficient NCO free radicals in the decomposition gas to react with the nitric oxide in the effluent gas to be treated. A slight excess of the stoichiometric amount of the reactive species generated from the cyanuric acid is desirable to insure maximum reduction of nitric oxide in the gas. Accordingly, since it is assumed that one mole of cyanuric acid generates three moles of NCO radicals, it would theoretically appear that one-third mole cyanuric acid would be effective to react with one mole of nitric oxide. In practice, larger amounts of cyanuric acid may be required depending upon the particular process and apparatus utilized for effecting the decomposition and subsequent reaction with nitric oxide. For example, it has been observed that the NCO free radicals have characteristic half-lives, and if the period of time (lapsed time) between the generation of the gaseous decomposition products and contact with the nitric oxide approaches or exceeds the half-life of the reactive species, additional amounts of the reactive species will be required to react the nitric oxide. For example, in a series of experiments, it has been determined at 800° F. and above, the half-life of NCO free radicals generated from the catalytic decomposition of cyanuric acid is in the range of about five minutes. Thus, the efficiency of the gaseous decomposition products in reacting with the nitric oxide in the gas diminishes as the time to contact with the nitric oxide increases (see Examples 29-40 and FIG. 5), and additional amounts of reactive species in the decomposition products are required to increase the percent of nitric oxide reacted.

In another embodiment, the present invention is a method of reducing the nitrogen oxide content of a gas stream utilizing NCO free radicals obtained by the reaction of formaldehyde with nitrogen or nitric oxide as described above. The reaction products containing NCO free radicals are particularly useful for treating gas streams containing nitrogen oxides such as post combustion gases resulting from the combustion of fossil fuels in internal combustion engines, hydrocarbon fueled power plants, coal fired utility boilers in other similar installations.

This embodiment of the invention is illustrated in FIG. 4. Formaldehyde and nitrogen or nitric oxide are fed to the reactor 40 which contains a catalyst. When nitrogen is fed to the reactor 40, the catalyst comprises vanadium, zirconium, or a mixture of vanadium and zirconium. When nitric oxide is fed to the catalytic reactor 40, the catalyst, as mentioned above, comprises zirconium or cerium or mixtures of zirconium and cerium. The temperature within reactor 40 is maintained at a temperature sufficient to effect the desired reaction but below about 1200° F. More often, the temperature within the first reaction zone 10 will be from about 600° F. to about 9990° F., and in one embodiment, the temperature within the first reaction zone will be from 820° F. to about 960° F. The period of contact between the formaldehyde, nitrogen and catalyst or formaldehyde, nitric oxide and catalyst, contained in reactor 40 is dependent upon a variety of factors including the temperature of the gases within the reactor, the type and amount of catalyst, etc.

The reaction product mixture (containing NCO free radicals) which is produced in reactor 40 is then advanced to a stack, flue gas duct, or exhaust pipe (reactor) 42 where the reaction product mixture is brought into contact with the effluent gas containing $NO_x$. The reactor 42 may be a smokestack, a flue, a gas turbine exhaust, or the exhaust pipe from an internal combustion engine such as a diesel engine. The temperature within reactor 42 may vary over a wide range and will be dependent in part upon the temperature of the effluent gas entering the reactor. In general, the method of the present invention wherein the reaction product mixture described above is brought into contact with gases containing $NO_x$ may range from ambient temperature to about 2000° F. It is a particular advantage of the present invention that some of the NCO radical containing reaction product mixtures obtained in accordance with this invention are effective in reacting with and reducing the nitrogen oxide content of effluent gases at low temperature including about ambient temperature. After the effluent gases have been treated in accordance with the method of the present invention in reactor 42, the gases can then be vented to the atmosphere or recovered if desired.

The amount of the reaction product mixture supplied to reactor 42 (i.e., flue, smokestack or other exhaust device) can be varied in accordance with the amount of NCO free radicals in the product mixture, the amount of $NO_x$ in the gas, and the desired objectives. Generally, the amount of NCO free radicals should be sufficient to react with the nitrogen oxides in the combustion gas based on the general assumption that one mole of formaldehyde can theoretically react with and remove two moles of NO from the gas.

In another embodiment shown in FIG. 4, the formaldehyde may be generated from methanol. For example, formaldehyde can be produced from methyl alcohol and air (oxygen) in the presence of various catalysts as described above.

The nitrogen oxide containing gas streams which can be treated with NCO free radicals in accordance with this invention may be derived from various mobile and stationary sources. Mobile sources include internal combustion engines such as are used in trucks, buses and automobiles, and fixed or stationary sources of nitrogen oxide include stack gases from commercial and residential furnaces, kilns, residual oil and coal-fired utility boilers, industrial boilers, gas turbines, incinerators, diesel engine generators, etc.

The following examples illustrate the method of the present invention. Unless otherwise indicated in the following examples and elsewhere in the specification and claims, all parts and percentages are by volume or mole, all temperatures are in degrees Fahrenheit, and pressures are at or near atmospheric pressure.

Examples 1-27 illustrate the formation of an NCO free radical containing gaseous product by reaction of formaldehyde with NO.

EXAMPLE 1-18

Nitric oxide gas is passed through a tube at the rate listed in Table I and mixed with formaldehyde at a molar ratio of 2NO:1H$_2$CO. The mixture passes through the tube to a stainless steel reactor where the mixture is heated to the temperature listed in Table 1. The gas exiting the reactor is passed through a condenser and a drier to remove water and a portion is collected and analyzed. The results of the analyses are also listed for these examples in Table I.

TABLE I

| Selective Non-Catalytic Reaction of H$_2$CO with NO (flow Tube) | | |
|---|---|---|
| Example | Flow Rate (cc/min) | Temp. (°F.) | % NO Reacted |
| 1 | 200 | 309 | 58.3 |
| 2 | 200 | 350 | 5.8 |
| 3 | 200 | 412 | 8.2 |

TABLE I-continued

Selective Non-Catalytic Reaction of $H_2CO$ with NO (flow Tube)

| Example | Flow Rate (cc/min) | Temp. (°F.) | % NO Reacted |
|---|---|---|---|
| 4 | 200 | 453 | 7.6 |
| 5 | 213 | 509 | 15.3 |
| 6 | 220 | 553 | 10.4 |
| 7 | 300 | 600 | 59.6 |
| 8 | 200 | 740 | 58.7 |
| 9 | 100 | 882 | 73.8 |
| 10 | 200 | 952 | 63.4 |
| 11 | 200 | 969 | 68.7 |
| 12 | 260 | 1030 | 63.2 |
| 13 | 200 | 1040 | 68.3 |
| 14 | 300 | 1080 | 86.1 |
| 15 | 200 | 1105 | 78.3 |
| 16 | 200 | 1140 | 74.2 |
| 17 | 200 | 1230 | 86.1 |
| 18 | 200 | 1314 | 94.6 |

EXAMPLES 19-26

In these examples a mixture of NO and $H_2CO$ in a molar ratio of $2NO:1H_2CO$ is contacted with a 2 grams of catalyst at an elevated temperature (about 500° to 1000° F.) under static conditions as identified in Table II. The $ZRO_2/CeO_2$ catalyst mixture contains equal amounts of the two oxides. The product gas is recovered and analyzed. The results also are shown in Table II.

TABLE II

Selective Catalytic Reaction of $H_2CO$ with NO (Static)

| Example | Catalyst | Temp. (°F.) | % NO Reacted |
|---|---|---|---|
| 19 | $ZrO_2$ | 511 | 29 |
| 20 | $ZrO_2$ | 707 | 20.3 |
| 21 | $CeO_2$ | 1008 | 72.9 |
| 22 | $ZrO_2/CeO_2$ | 754 | 66.2 |
| 23 | $ZrO_2/CeO_2$ | 900 | 73.2 |
| 24 | $ZrO_2/CeO_2$ | 904 | 85.1 |
| 25 | $ZrO_2/CeO_2$ | 1009 | 61.2 |
| 26 | $ZrO_2/CeO_2$ | 1008 | 100 |

EXAMPLE 27

Methanol is oxidized to formaldehyde with a iron/molybdenum catalyst at a temperature of about 550°-650° F. with an $O_2:CH_3OH$ molar ratio of 1:2. The formaldehyde is then contacted with an NO-containing gas at a temperature of 1205° F. under static conditions. The molar ratio of $NO:CH_3OH$ is 2:1. Analysis of the product gas indicates 93.6% of the NO was reacted. A repeat of this experiment except that a $3O_2:4CH_3OH$ molar ratio is used results in a 68.8% of the NO being reacted.

EXAMPLE 28 (FIG. 2)

This example utilizes a flow-tube reactor system and continuous flow of nitric oxide and the gaseous NCO free radical containing decomposition products from the catalytic decomposition of cyanuric acid. A mixture of 44 gms of cyanuric acid and 8 gms of zirconium oxide is prepared and charged to a decomposition tank. The decomposition tank is attached to a quartz tube reactor containing alumina maintained at a given elevated temperature. The quartz tube reactor is equipped with a tube through which nitric oxide gas can be introduced into the quartz tube reactor for reaction with the cyanuric acid decomposition gas. The quartz tube reactor also is equipped with an outlet through which the gas within the reactor can exit. The gases which exit the quartz tube reactor after the reaction between the nitric oxide and the cyanuric acid decomposition product containing NCO free radicals advance to a condenser where water is removed, and the gas is then dried, analyzed and/or vented to the atmosphere.

In this example, the cyanuric acid and zirconium oxide are mixed thoroughly and charged to the decomposition tank. After purging with helium, the contents of the decomposition tank are heated to a temperature of about 700° F. and maintained within a temperature range from about 700° F. to about 843° F. for a period of about 3 hours. The NCO free radical containing gas from the decomposition tank is continuously advanced to the quartz tube reactor which is maintained at a temperature of from about 838° F. to about 1250° F. (an average temperature about 843° F.) as the nitric oxide is fed to the reactor. Analysis of the gas recovered from the quartz tube reactor indicates a NO reduction of 63.4%.

EXAMPLE 29-40 (FIG. 3)

In these examples, the cyanuric acid and catalyst are not premixed and charged to the decomposition tank. Cyanuric acid is charged to a vaporizing tank which is attached to a decomposition tank containing the catalyst. The exit gas from the decomposition tank advances to a quartz reactor containing alumina support. The quartz reactor is equipped with an inlet tube for nitric oxide and an exit tube for the gases flowing out of the reactor. The exit gases pass through a condenser, dryer, and an analyzer to being vented to the atmosphere.

About 44 gms of cyanuric acid are charged to the vaporization tank, and 75 cc. of zirconia catalyst ZR-0304T1/8 from the Engelhard Corporation are charged to the decomposition tank. The cyanuric acid in the vaporization tank is heated to a temperature of about 850° F. for a period of about 6 hours. The catalyst within the decomposition tank is heated to a temperature of about 800°-850° F., and the vaporized cyanuric acid is fed to the decomposition zone and decomposed in the presence of the catalyst. The quartz reactor tank is heated to a temperature of about 500° F. to about 1000° F. The flow of nitric oxide through the reactor vessel is begun as the NCO free radical containing decomposition gas is also fed to the reactor vessel. The elapsed time from decomposition to contact with NO in the reactor is noted. The gas which is recovered from the reactor is analyzed for NO content and the percent reacted determined. The details of these experiments and the results obtained are summarized in the following Table III.

TABLE III

Flow Reactor Experiments

| Example | Temp. (°F.) Catalyst | Temp. (°F.) Reactor | Flow rate (ccpm) | Time till contact (min.) | Stoichiometry HNCO:NO | % NO Reacted |
|---|---|---|---|---|---|---|
| 29 | 832 | 727 | 175 | 2.3 | 1.10 | 58.3 |
| 30 | 830 | 680 | 187 | 2.4 | 0.87 | 51 |
| 31 | 831 | 869 | 140 | 2.6 | 1.30 | 84 |
| 32 | 829 | 720 | 108 | 3.3 | 1.30 | 58.8 |
| 33 | 836 | 858 | 95 | 3.6 | 1.50 | 93.4 |
| 34 | 832 | 861 | 85 | 4.3 | 1.30 | 82.2 |
| 35 | 840 | 956 | 230 | 4.5 | 1.70 | 81.4 |
| 36 | 813 | 1020 | 167 | 5.6 | 1.70 | 67.3 |
| 37 | 841 | 915 | 130 | 7.5 | 1.60 | 54.2 |
| 38 | 840 | 898 | 150 | 7.5 | 1.50 | 52.9 |
| 39 | 837 | 932 | 135 | 8.0 | 1.30 | 55.2 |
| 40 | 844 | 983 | 120 | 8.5 | 1.40 | 45.3 |

Figure 5:
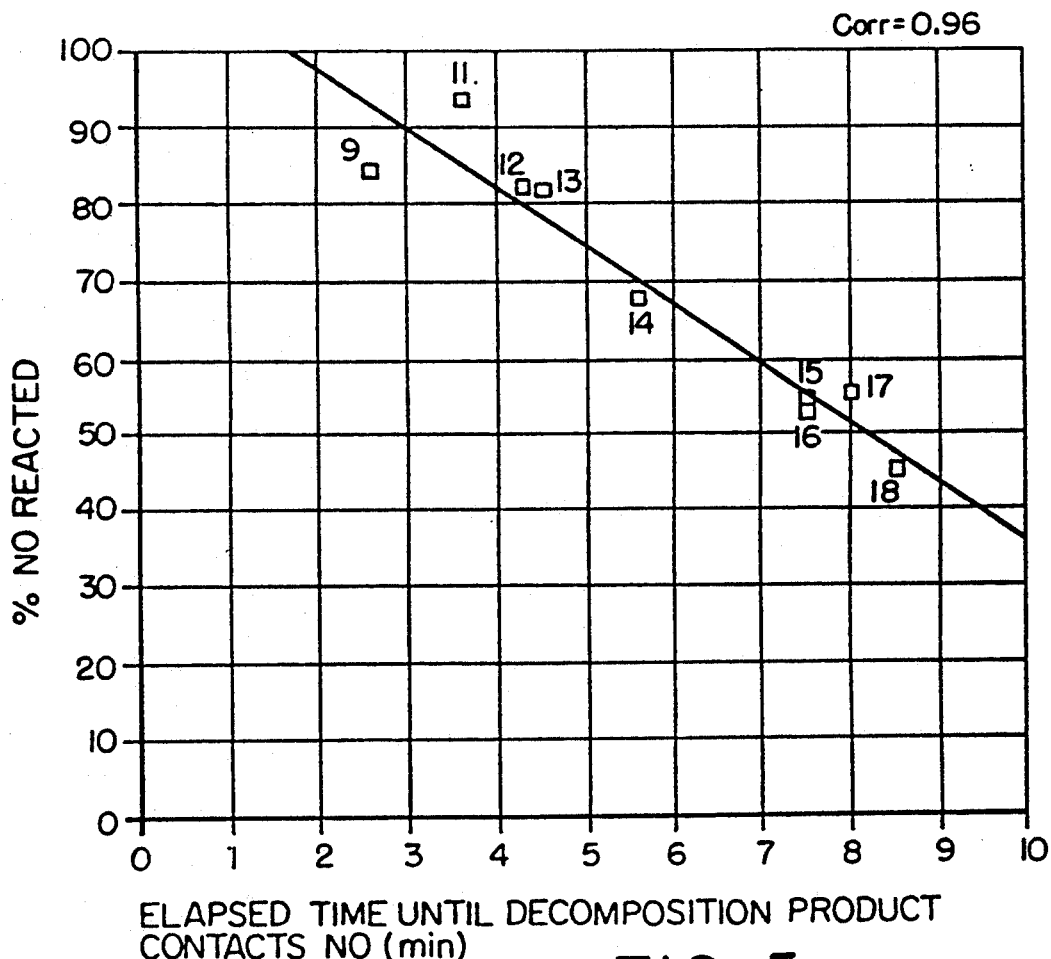
FIG. 5 is a graph of percent NO reduction vs. elapsed time (min.) until the cyanuric acid decomposition product contacts the nitric oxide.

The relationship of elapsed time from formation of the cyanuric acid decomposition product to percent of NO reacted is illustrated in the graph of FIG. 5. As the elapsed time increases from about 2.5 to 8.5 minutes, the effectiveness of the decomposition product decreases.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as fall within the scope of the appended claims.

We claim:

1. A process for reducing the nitrogen oxide content of a post combustion gas which comprises the steps of
    (a) generating NCO free radicals by
        (a-1) heating cyanuric acid in the presence of a catalyst which comprises zirconium, phosphorus or a mixture of zirconium and phosphorus at a temperature of less than 1000° F.,
        (a-2) reacting formaldehyde with nitrogen in the presence of a catalyst capable of promoting the reaction,
        (a-3) reacting formaldehyde with nitric oxide,
        (a-4) reacting carbon monoxide with nitric oxide, nitrogen or a mixture thereof,
        (a-5) reacting of methanol with nitrogen, or
        (a-6) combinations of any one of (a-1)–(a-5), and thereafter
    (b) adding the free radicals to the gas whereby the NCO free radicals react with the nitrogen oxide in the gas at a temperature of from ambient temperature up to about 2000° F.

2. The process of claim 1 wherein the gas is contacted with the NCO free radicals at a temperature of from about 300° F. to about 2000° F.

3. The process of claim 1 wherein the zirconium and phosphorus are in the plus four oxidation state.

4. The process of claim 1 wherein the catalyst comprises zirconium oxide.

5. The process of claim 1 wherein the cyanuric acid is heated in the presence of the catalyst at a temperature of from about 760° F. to about 960° F.

6. The process of claim 1 wherein the NCO free radicals are generated by reacting formaldehyde with nitrogen in the presence of a catalyst comprising vanadium, zirconium, or a mixture of vanadium and zirconium at a temperature below about 1200° F.

7. The process of claim 6 wherein the reaction between the formaldehyde and nitrogen is conducted at a temperature of from about 600° F. to about 990° F.

8. The method of claim 6 wherein the formaldehyde is obtained from the oxidation of methanol.

9. The process of claim 1 wherein the NCO free radicals are generated in (a) by reacting formaldehyde with nitric oxide.

10. The process of claim 9 wherein the reaction of formaldehyde with NO in step (a) is conducted in the presence of a catalyst comprising zirconium, cerium or mixtures thereof.

11. The process of claim 10 wherein the catalyst comprises zirconium in the plus four oxidation state, cerium in the plus four oxidation state, or a mixture thereof.

12. The process of claim 10 wherein the catalyst comprises a mixture of zirconium in the plus four oxidation state and cerium in the plus four oxidation state.

13. The process of claim 1 wherein the NCO free radicals are generated in step (a) by reaction of carbon monoxide with nitric oxide, nitrogen or a mixture thereof.

14. The process of claim 1 wherein the NCO free radicals are generated in step (a) by reaction of methanol with nitrogen.

15. The process for reducing the nitrogen oxide content of a post combustion gas stream which comprises
    (a) generating NCO free radicals capable of reacting with nitrogen oxide by,
        (a-1) decomposing cyanuric acid in the presence of a catalyst comprising zirconium, phosphorus or a mixture of zirconium and phosphorus, or
        (a-2) reacting formaldehyde with nitrogen in the presence of a catalyst comprising vanadium or zirconium, or a mixture thereof, and thereafter
    (b) adding the NCO free radicals to the gas stream at a temperature of from ambient temperature to about 2000° F. whereby the NCO free radicals react with the nitrogen oxide in the gas stream.

16. The process of claim 15 wherein the NCO free radicals are generated in (a) by decomposing cyanuric acid in the presence of a catalyst comprising zirconium, phosphorus, or a mixture of zirconium and phosphorus.

17. The process of claim 16 wherein the zirconium and phosphorus are in the plus four oxidation state.

18. The process of claim 15 wherein the NCO free radicals are generated in (a) by reacting formaldehyde with nitrogen in the presence of a catalyst comprising vanadium or zirconium, or a mixture thereof, at a temperature below about 1200° F.

19. The process of claim 15 wherein the post combustion gas stream is an engine exhaust gas stream.

20. The method of claim 15 wherein the post combustion gas stream is a smokestack or boiler exhaust gas stream.

* * * * *